(12) United States Patent
Shelest et al.

(10) Patent No.: US 7,673,326 B2
(45) Date of Patent: Mar. 2, 2010

(54) SYSTEM AND METHOD UTILIZING CLEAN GROUPS FOR SECURITY MANAGEMENT

(75) Inventors: Art Shelest, Sammamish, WA (US); Jesper M. Johansson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1102 days.

(21) Appl. No.: 10/771,840

(22) Filed: Feb. 4, 2004

(65) Prior Publication Data

US 2005/0172142 A1    Aug. 4, 2005

(51) Int. Cl.
G06F 12/14    (2006.01)
(52) U.S. Cl. .............................. 726/4; 726/22; 713/151
(58) Field of Classification Search .................. 713/179, 713/181
See application file for complete search history.

(56) References Cited

U.S. PATENT DOCUMENTS

| | | | | |
|---|---|---|---|---|
| 7,162,649 | B1 * | 1/2007 | Ide et al. ..................... | 713/165 |
| 7,249,187 | B2 * | 7/2007 | Sobel et al. ................. | 709/229 |
| 7,587,607 | B2 * | 9/2009 | Brickell et al. .............. | 713/182 |
| 2003/0055962 | A1 * | 3/2003 | Freund et al. ................ | 709/225 |
| 2003/0065942 | A1 * | 4/2003 | Lineman et al. ............. | 713/201 |
| 2004/0103310 | A1 * | 5/2004 | Sobel et al. .................. | 713/201 |
| 2004/0107360 | A1 * | 6/2004 | Herrmann et al. ........... | 713/201 |

OTHER PUBLICATIONS

Hochmuth, P., and E. Messmer, "Cisco's Security Plan Eyed Warily," *Network World Fusion*, Nov. 24, 2003, retrieved from <<http://www.nwfusion.com/news/2003/1124 cicsosec. html?net>> on Dec. 15, 2003.

Hutchison, A., and M. Wallbaum, "A Performance Comparison of Group Security Mechanisms," *Proceedings of 17th International Conference on Computer Safety, Reliability and Security*, Heidelberg, Germany, Oct. 5-7, 1998, pp. 103-116.

Kim, Y., et al., "Secure Group Services for Storage Area Networks," *IEEE Communications Magazine* 41(8)92-99, 2003.

Lee, J.-M., et al., "Design of Secure Group Key Management System," *Proceedings of the International Society for Optical Engineering*, vol. 4527. Denver, Colo. Aug. 21-23, 2001, pp. 17-28.

(Continued)

*Primary Examiner*—Jung Kim
*Assistant Examiner*—Gilberto Barron, Jr.
(74) *Attorney, Agent, or Firm*—Wolf, Greenfield & Sacks, P.C.

(57) ABSTRACT

A system and method that utilizes clean groups for reducing security management complexity. The system reduces the complexity of managing security technologies by automatically assigning objects such as computers or persons to clean groups which are defined by existing management infrastructure. In an embodiment where members are computers, ongoing automatic efforts ensure that clean groups include only computers that satisfy specified security principles, which allows administrators to treat all computers that are in compliance as a group. Separately, the members of the clean group are required to implement self-governance, which is an ability to detect being compromised and to take steps to remove themselves from the clean group when they are compromised. In addition to attempting to remove itself from the clean group, a compromised computer may take additional steps aimed at minimizing further damage, such as erasing or hiding computer domain credentials, hiding/protecting/disabling cryptographic (e.g. EFS) keys, or logging out a user.

51 Claims, 15 Drawing Sheets

OTHER PUBLICATIONS

Lemos, R., "Cisco, Others Plan to Ban Insecure PCs," CNET News. com, Nov. 18, 2003, retrieved from <<http://news.com.com/2100-7355_3 5108883.html?tag=st_util_print>> on Dec. 15, 2003.

Leyden, J., "Cisco Combats Network Worms," *The Register*, Nov. 18, 2003, retrieved from <<http://theregister .co.uk./content/56/34055. html>> on Dec. 15, 2003.

Morphy, E., "Cisco's Gang of Four Tackles Security Fears," *News Factor Network*, retrieved from http://www.newsfactor.com/perl/printer 2225/ on Dec. 1, 2003.

Nishio, G.-I., et al., "Group Communication Security on Regional PC Communication Networks," *Electronics and Communications in Japan, Part 1*, vol. 83, No. 2, 2000, pp. 10-19.

Reiter, M., et al., "Integrating Security in a Group Oriented Distributed System," *Proceedings of 1992 IEEE Computer Society Symposium on Research in Security and Privacy*, Oakland, Calif., May 4-6, 1992, pp. 18-32.

Roberts, P., "Cisco, Antivirus Companies Team To Battle Worms," Nov. 18, 2003, retrieved from <<http://www.computerworld.com/printthis/2003/0,4814,87282,00.html.>>.

* cited by examiner

SYSTEM AND METHOD UTILIZING CLEAN GROUPS FOR SECURITY MANAGEMENT

FIELD OF THE INVENTION

The present invention relates to security management, and more particularly, to the utilization of clean groups for reducing security management complexity.

BACKGROUND OF THE INVENTION

One of the everyday tasks that network administrators are required to implement is keeping the computers and servers in their systems up to date and having all the latest patches installed. Network administrators are required to make sure that the latest versions of the software and data files are present, and that the configuration is consistent and up to date. Data files that may be required to be kept up to date may consist of items such as virus signatures. One of the advantages of keeping everything up to date is that by doing so the network administrator is able to minimize risks from viruses that exploit vulnerabilities and ensure consistent and reliable configurations.

In known systems where computers connect through a small number of connection points (i.e., choke points), quarantine mechanisms may be created at these known choke points. In other words, a system may be put in place by which when the server which is at the choke point of a network is connected to, the server checks out the connecting client to determine what state it is in, and if it is in an acceptable safe state, then it is let into the network. If it is in an unacceptable state, it may either be rejected automatically, or may be guided through the steps for being placed in an acceptable state. This method works best when there are a small number of choke points. The method is less desirable when computers are connected in a system such as a wireless network or an Ethernet, where there are large numbers of potential access points through which the system can be entered. For example, in a corporate network where there may be many thousands of ports, due to the expense and complexity it is generally not practical to use known techniques to equip each of these ports with a quarantine system.

The embodiment of the present invention is related to providing a system and method that overcome the foregoing and other disadvantages. More specifically, the embodiment of the present invention is related to a system and method which utilizes clean groups for reducing security management complexity.

SUMMARY OF THE INVENTION

A system and method which utilizes clean groups for reducing security management complexity is provided. In accordance with one aspect of the invention, the system automatically assigns "clean" objects such as computers or users to clean groups that are defined by the existing management infrastructure. Ongoing automatic efforts ensure that the clean groups include only objects that satisfy specific security requirements, thus allowing administrators to treat all objects that are in compliance as a group.

In accordance with another aspect of the invention, each of the members of the clean group is required to implement self-governance. In one embodiment where the members are computers, self-governance is defined as the ability to detect when a computer is compromised, and to take steps to remove the computer from the clean group when such compromise occurs. When a compromise is detected, additional steps may also be implemented which are aimed at minimizing further damage.

In accordance with another aspect of the invention, computers that are members of the clean group are defined as being those with all of the currently available patches (which in one embodiment may comprise security updates and service packs) required by policy being installed as determined by an update component. The administrator may also define other policies which a computer must be compliant with in order to be a member of the clean group. The initial assignment of computers into the clean group is accomplished by each individual computer installing a clean runtime component that performs a compliance check upon its initial execution, and depending on the result of the compliance check, takes either an assignment or a self-governance action. Ongoing clean group maintenance may consist of periodic compliance checks (e.g., every hour) to ensure ongoing compliance. In another embodiment, rather than being periodic, the compliance checks may be performed at random or near-random time intervals. In one example, a compliance check is implemented by the clean runtime component checking with the update Web site to determine whether new updates are available for the computer. If connection to the update Web site is unavailable for a specified period of time (e.g., an hour), the compliance check fails and a self-governance action may be taken.

In accordance with another aspect of the invention, an assignment action provides a way for a computer to be moved into or out of the clean group. In one embodiment, the computer itself does not have permission to move itself into or out of the clean group. Instead, a clean runtime component securely communicates with a server on the network by sending a protected "add" or "remove" request. An "add" request initiates a compliance check with the clean group server, and when the client submits sufficient proof of being compliant with the policy, the clean group server moves the computer into the clean group and starts the countdown for a specified period of time (e.g. one week). In other words, in one embodiment, an "add" message does not automatically cause the client to be added to the clean group, instead the "add" message is a request which includes evidence that will be evaluated by the clean group server for purposes of making the "add" decision (in contrast, in one embodiment a "remove" request may be processed automatically, in that a client may securely request its own removal from the clean group without specifying reasons.) If the computer does not send another "add" message, it will be removed after the specified period of time (e.g., one week). If the computer does send another "add" message, the countdown is restarted. In other words, in one embodiment clean group membership is temporary and must be renewed at administratively defined intervals.

In accordance with another aspect of the invention, the compliance checks can be initiated periodically by the client computers which wish to maintain their clean group membership, by the clean group server scanning the network or making random checks, and by client computers or clean group server in response to important network events such as client coming online, client state/configuration changes or network state/configuration changes. In one embodiment, it is important to note the difference between a client-performed compliance check that can trigger a client's "remove" action while not being in contact with the clean group server, and a more comprehensive server+client compliance check using the latest policy information available to the clean group server. In one embodiment, the more comprehensive check is used for joining the clean group or restarting the membership expiration timer. In one embodiment, if a compliance policy has changed then non-compliant computers are checked for.

In accordance with another aspect of the invention, a self-governance action is taken in the event that a compliance check fails (e.g., new updates are available and they cannot be automatically installed), or the update Web site is unreachable for longer than a specified period of time (e.g., one hour). Under such circumstances, the clean runtime component may perform a self-governing action such as attempting to send a protected "remove" request to the clean group server. Additional actions may include erasing or hiding the computer domain credentials, or otherwise invalidating the clean group membership through local actions. Other optional actions may include taking additional steps aimed at preventing disclosure of sensitive data or preventing viruses/hackers from taking advantage of existing credentials, such as hiding/disabling EFS decryption keys, or logging out a user.

In accordance with another aspect of the invention, a mechanism is provided for the clean group server to communicate to non-compliant clients the instructions on how to get back into compliance. For example, a client may be redirected to a web site with online instructions to the user, and once the instructions are followed, the client will initiate another server-assisted compliance check with the objective to join the clean group. Alternatively, the client may be instructed on how to get into a policy-compliant state automatically and without user's involvement.

In accordance with another aspect of the invention, a tie-in is provided between computer and user clean group membership. In situations where a computer's membership is not used for making access control decisions, the user's clean group membership is computed on the basis of whether user's computer(s) are in compliance with the policy. By projecting computer non-compliance to the user, existing user-based access control mechanisms are used to deny access from non-compliant computers.

In accordance with another aspect of the invention, clean groups may be utilized for enabling functionality, such as implementing computer security policy. In one embodiment, clean groups can be used to provide enforcement by binding Active Directory Group Policy to the group membership such that only members of the group can read the policy. In one implementation, the policy may provide IPSec communication requirements and parameters. Since only computers which comply with the policy and, hence, are members of the clean group, can read the IPSec policy parameters, only those computers which are in compliance can communicate with each other. Computers which are not in the clean group will be prevented from communicating with computers in the clean group, in effect providing a quarantine mechanism. In one implementation this also requires a client that changes state from membership in the clean group to non-membership to clear all policy settings distributed via the clean-group.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

A system and method which utilizes clean groups for reducing security management complexity is provided. The embodiment of the invention simplifies the management of security technologies by introducing clean groups of computers/users/objects that are in compliance and a methodology for maintaining specific in-compliance properties for members of the groups. The simplification of security technology management through use of existing and familiar mechanism results in lowering the learning curve and reducing the overall system costs.

Figure 1:
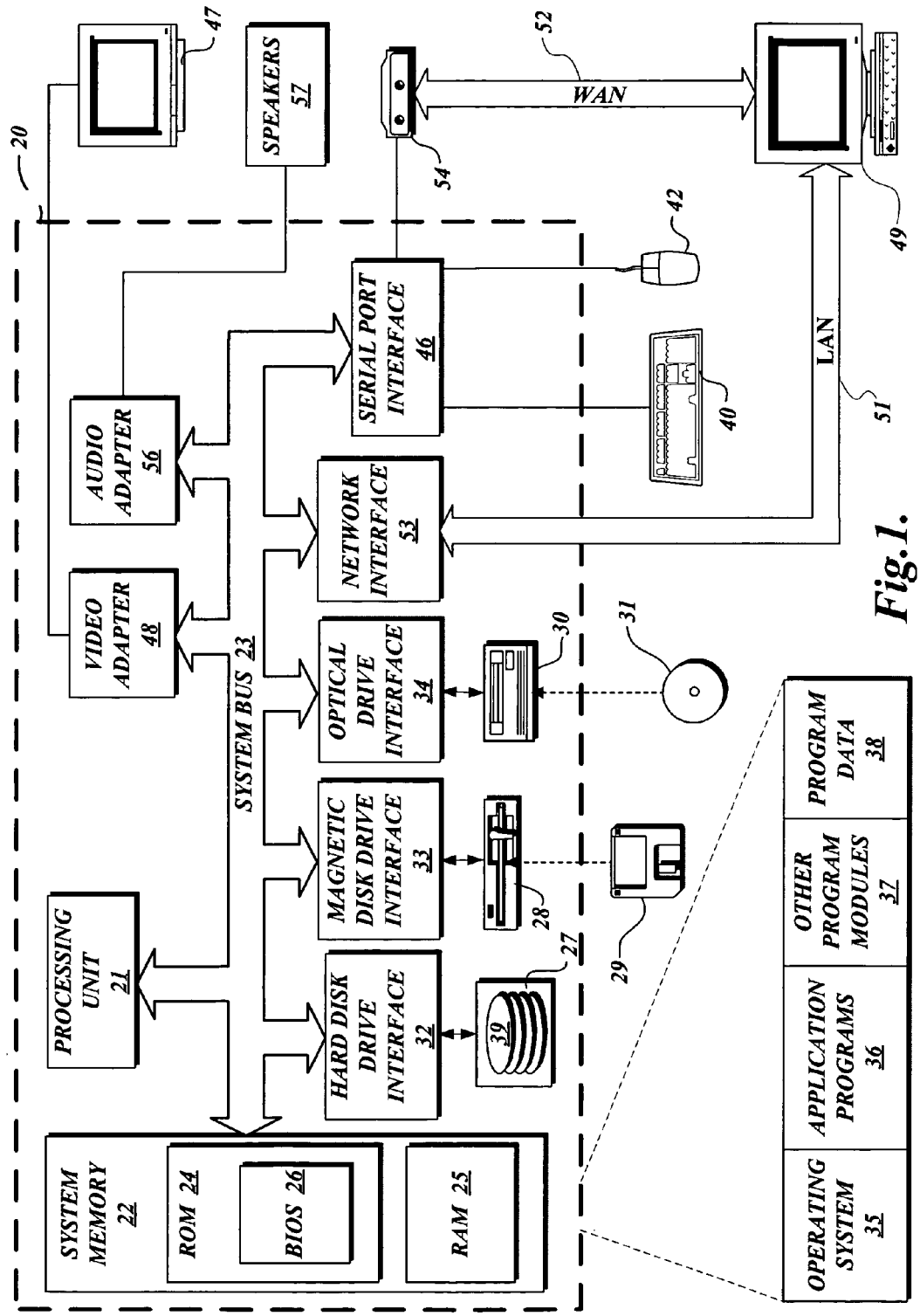
FIG. 1 is a block diagram of a general purpose computer system suitable for implementing the embodiment of the present invention.

FIG. 1 and the following discussion are intended to provide a brief, general description of a suitable computing environment in which the embodiment of the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that helps to transfer information between elements within the personal computer 20, such as during start-up, is stored in ROM 24. The personal computer 20 further includes a hard disk drive 27 for reading from or writing to a hard disk 39, a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer-readable instructions, data structures, program modules, and other data for the personal computer 20. Although the exemplary environment described herein employs a hard disk 39, a removable magnetic disk 29, and a removable optical disk 31, it should be appreciated by those skilled in the art that other types of computer-readable media which can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk 39, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may also be connected by other interfaces, such as a parallel port, game port or a universal serial bus (USB). A display in the form of a monitor 47 is also connected to the system bus 23 via an interface, such as a video card or adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked environment using logical connections to one or more personal computers, such as a remote computer 49. The remote computer 49 may be another personal computer, a server, a router, a network PC, a peer device or other common network node, and typically includes many or all of the elements described above relative to the personal computer 20. The logical connections depicted in FIG. 1 include a local area network (LAN) 51 and a wide area network (WAN) 52. The LAN 51 and WAN 52 may be wired, wireless, or a combination thereof. Such networking environments are commonplace in offices, enterprise-wide computer networks, intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20 or portions thereof may be stored in the remote memory storage device. It will be appreciated that the network connections shown are exemplary, and other means of establishing a communications link between the computers may be used.

As will be discussed in more detail below, the embodiment of the invention reduces the complexity of managing security technologies by automatically assigning objects such as computers or persons to clean groups as defined by existing management infrastructure. In an embodiment where the members are computers, ongoing automatic efforts ensure that the clean groups include only computers that satisfy specified security principles, thus allowing administrators to treat all of the in-compliance computers as a group. Separately, the members of the clean group are required to implement self-governance. Self-governance may include a computers ability to: (1) detect attempted compromise and to take steps to remove themselves from the clean group when they are compromised; (2) detect a state change from compliance to non-compliance with the security policy and either reverse the state change or remove themselves from the clean group when they are compromised; and (3) detect changes in the security policy and take steps to ensure the computer is compliant with the new policy or remove itself from the clean group in case compliance with the new policy is temporarily or permanently impossible for any reason. When a computer is compromised, it may also take additional steps aimed at minimizing further damage, as will be discussed in more detail below.

In general, the clean group is defined as being a group of computers, users, or other objects that share one or more common security properties that make them safer and more trusted than objects not included in the clean group. The clean group guarantees essentially include a set of security parameters that objects in the clean group are expected to meet at all times. The clean group maintenance is a methodology for assigning computers/users/objects to and from the clean group with the objective of meeting the clean group guarantees at all times. Self-governance is provided, which in an embodiment where the members are computers is a computer's ability to take immediate internal and/or external self-restricting action in the event the computer becomes compromised. The purpose of such action is to limit the damage to the data and infrastructure normally accessible by the computer. In one embodiment, a clean runtime program is executed on the computers, which implements the clean group maintenance and self-governance functions. A clean group server is utilized which participates in the clean group maintenance.

Figure 2:
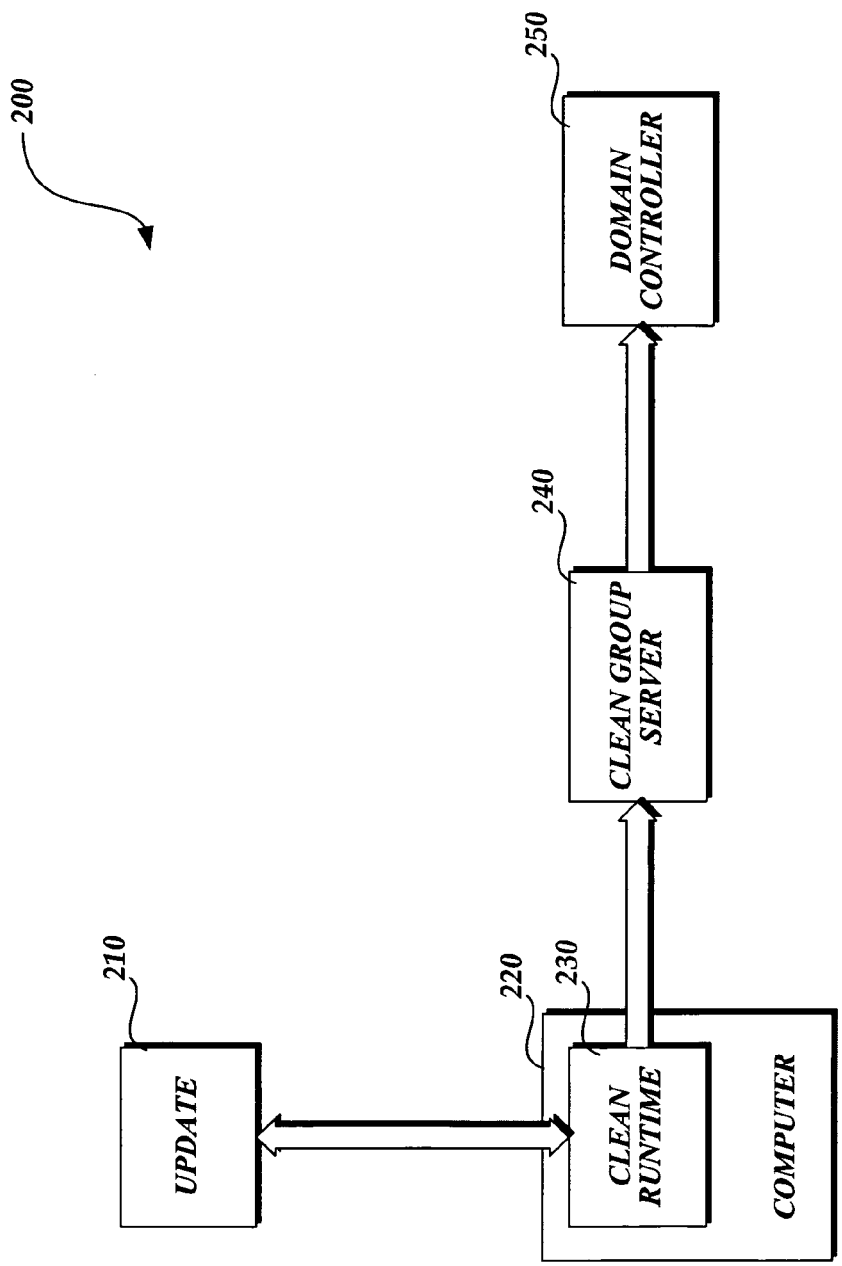
FIG. 2 is a block diagram illustrative of components of a computer system utilizing clean groups.

FIG. 2 is a block diagram of individual components and their communications for a system 200 that utilizes clean groups. As shown in FIG. 2, an update component 210 communicates with a clean runtime component 230 which runs within a computer 220. As will be discussed in more detail below, the update component 210 may comprise a Web site and the clean runtime component 230 may comprise a program which is executed on the computer 220 and which implements the clean group maintenance and self-governance functions. The clean runtime component 230 communicates with the clean group server 240 which communicates with a domain controller 250 which is part of the infrastructure that participates in the clean group maintenance.

Figure 3:
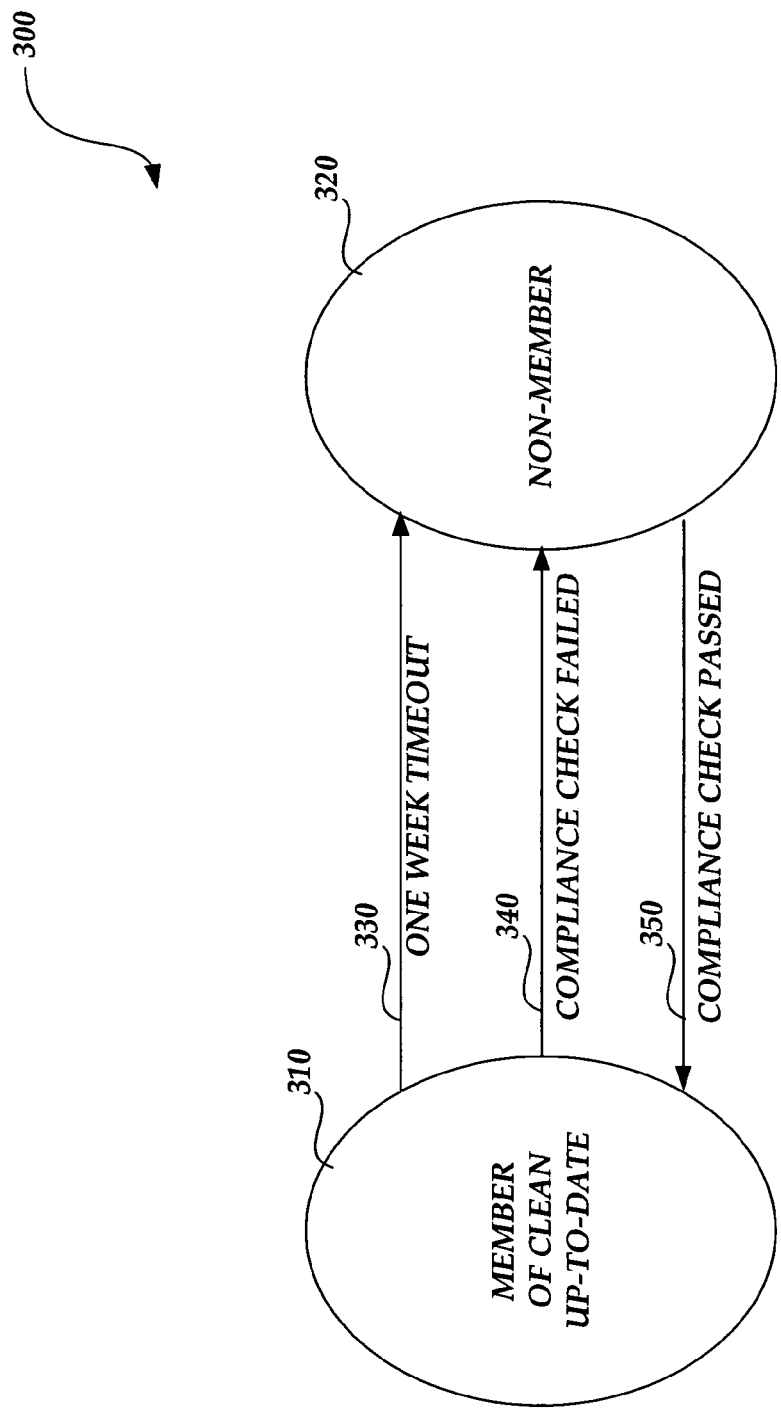
FIG. 3 is a diagram illustrative of member and non-member groups for a clean group system.

FIG. 3 is a diagram of a computer system 300 illustrating the transfer of computers to and from a clean group. As shown in FIG. 3, the computer system 300 includes a member group 310 and a non-member group 320. The computers in the member group 310 are members of the clean up-to-date group. A transfer line 330 shows that a computer may be removed from the clean group 310 when it does not renew its membership by communicating with the clean-group server within a specified period of time (e.g., one week), as will be described in more detail below with reference to FIG. 7. A transfer line 340 shows that a computer may also be removed from the clean group 310 if a compliance check fails for the computer, as will be described in more detail below with reference to FIG. 8. A transfer line 350 shows that a computer may be added to the clean group 310 if the compliance check is passed, as will be described in more detail below with reference to FIG. 6.

Figure 4A:
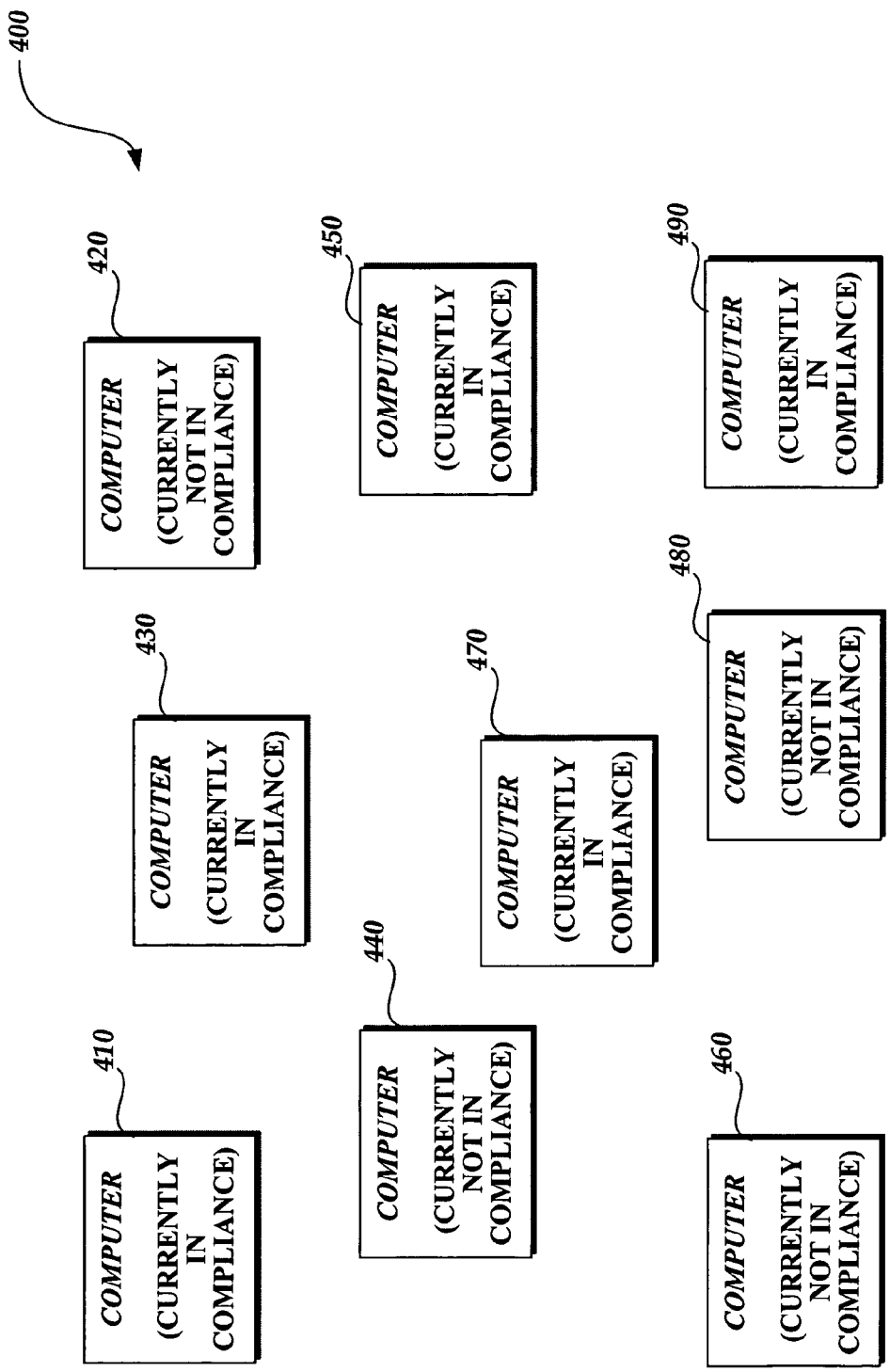
FIGS. 4A-4D are block diagrams illustrative of a set of computers for which a clean group is formed.

FIGS. 4A-4D are block diagrams of a computer system 400 including computers that are in compliance and computers that are out of compliance. As shown in FIG. 4A, the computer system 400 includes computers 410-490. The computers 410, 430, 450, 470 and 490 are illustrated as being currently in compliance, while the computers 420, 440, 460, and 480 are illustrated as being currently not in compliance.

Figure 4B:
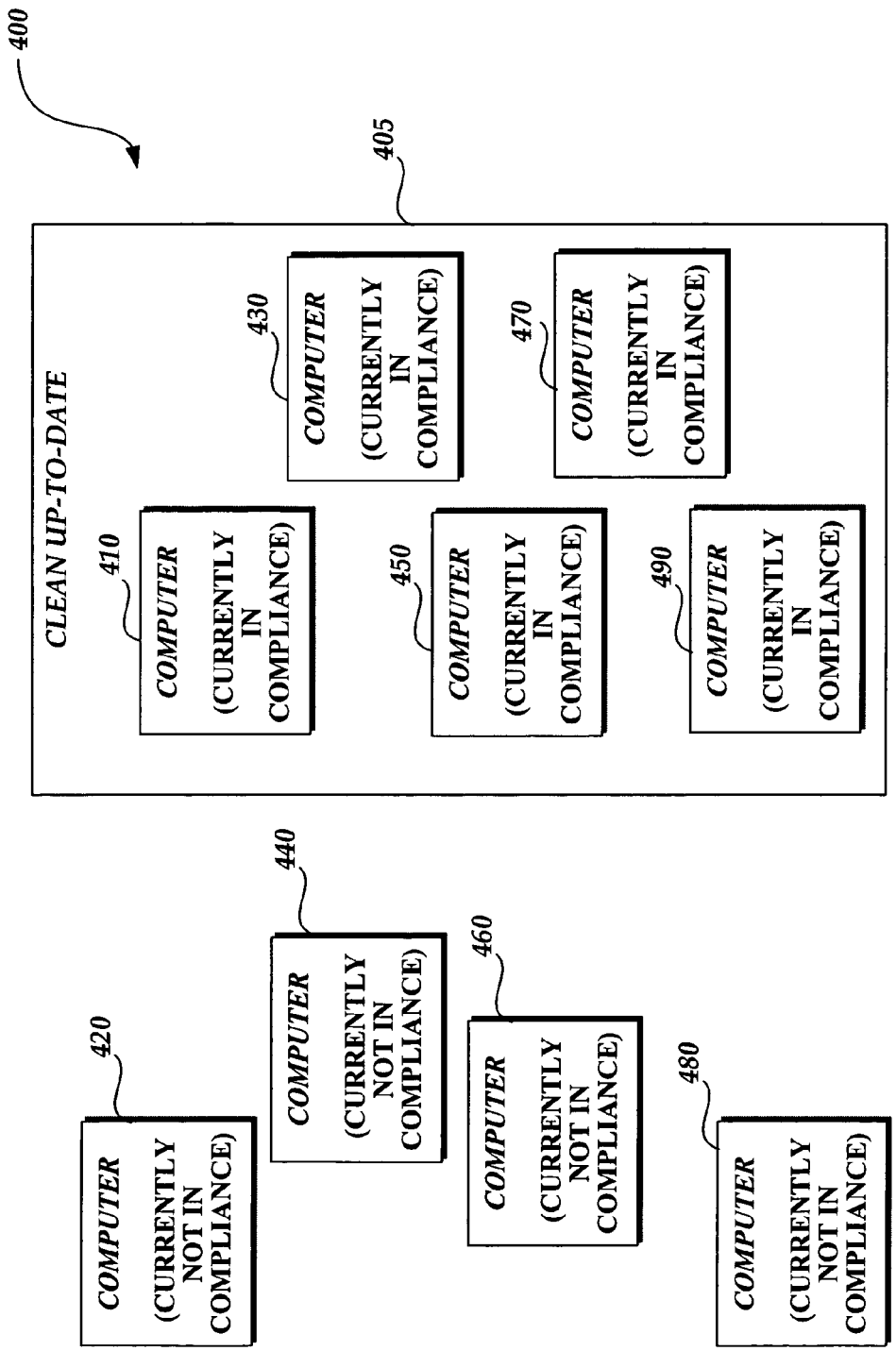
Figure 4C:
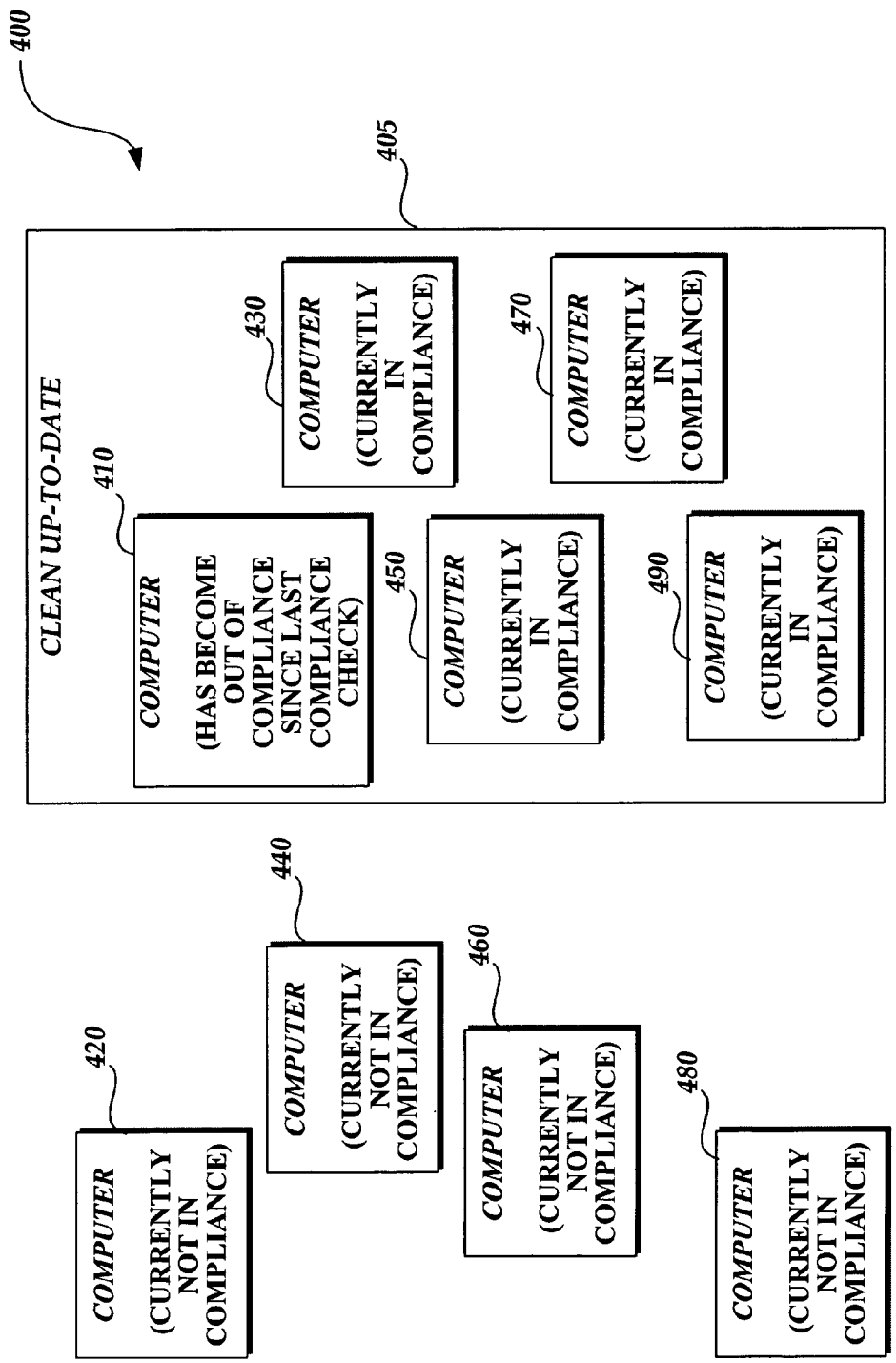
Figure 4D:
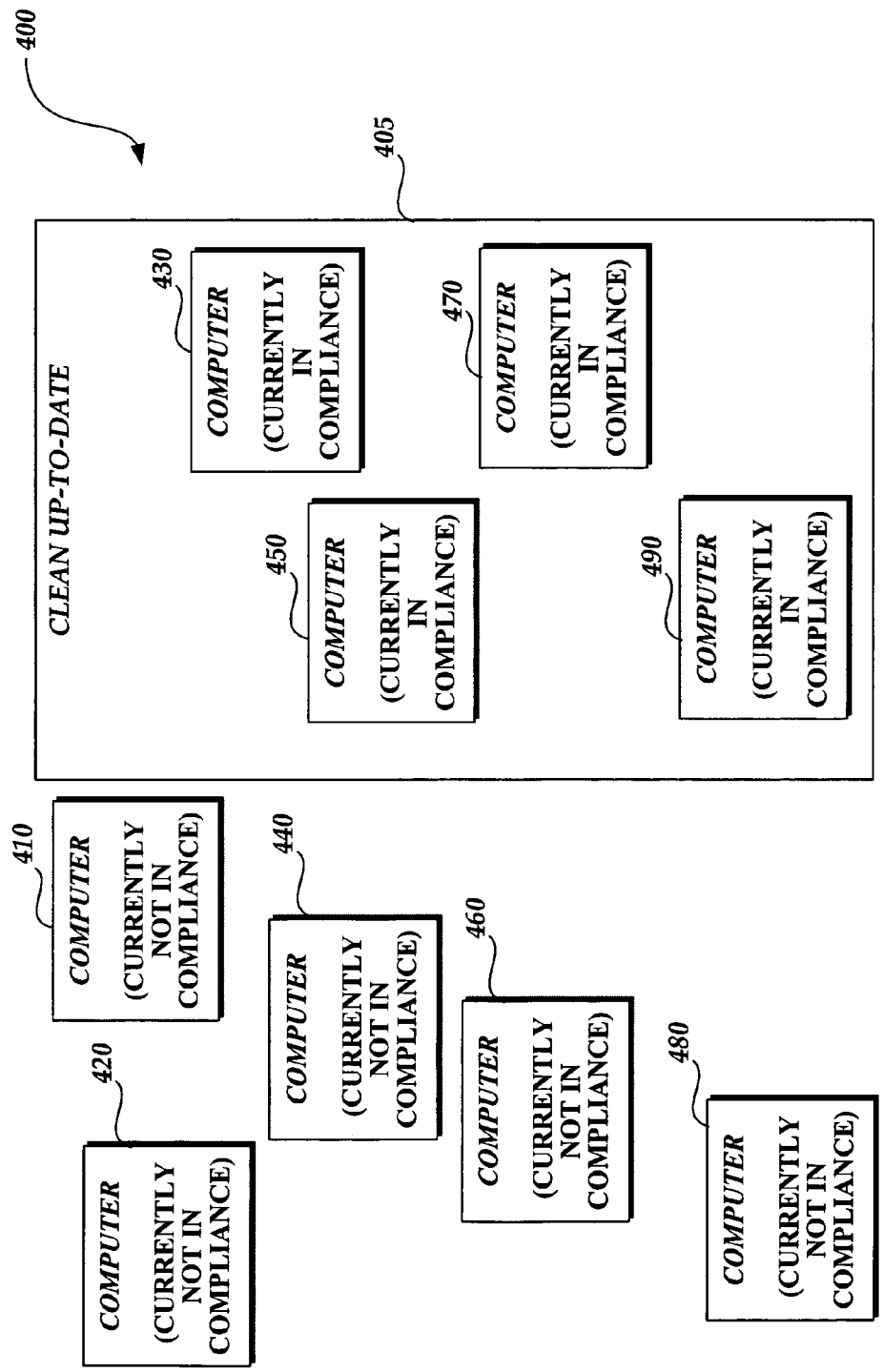

As illustrated in FIG. 4B, the computers that are currently in compliance have been grouped into a clean up-to-date group 405. In other words, the clean group 405 is shown to include the computers 410, 430, 450, 470 and 490. Then, as illustrated in FIG. 4C, one of the computers that was previously in compliance becomes out of compliance. More specifically, since the time of the last compliance check, the computer 410 has become out of compliance. One example of a computer becoming out of compliance is when the computer is out of contact for over a certain period of time (e.g., a one-week timeout). As a result of the computer 410 of FIG. 4C becoming out of compliance since the last compliance check, the computer 410 will be moved out of the clean group 405. Thus, as illustrated in FIG. 4D, the computer 410 is moved out of the clean group 405. This movement out of the clean group 405 may occur after specified events such as period of time (e.g., one-week timeout) or after failing a compliance check.

Figure 5:
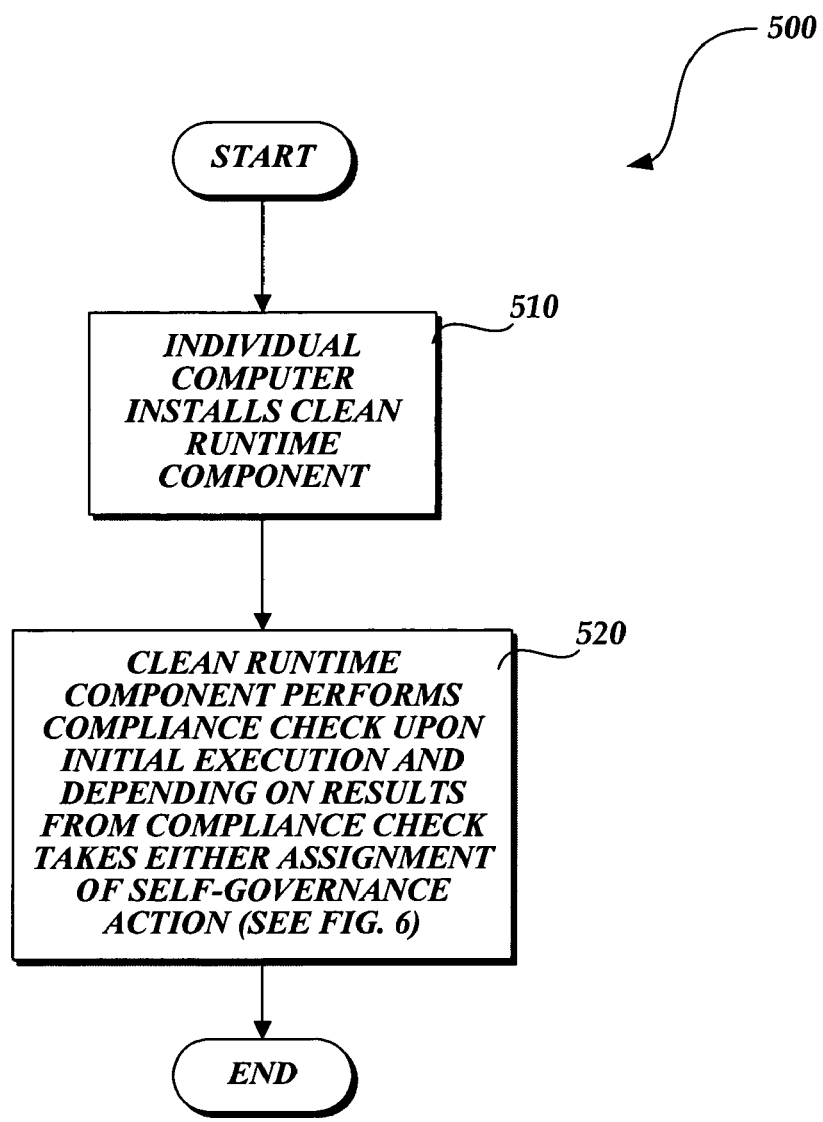
FIG. 5 is a flow diagram illustrative of a routine for the initial installation and execution of a clean runtime component.

FIG. 5 is a flow diagram illustrative of a routine 500 for the initial installation and execution of a clean runtime component. At a block 510, an individual computer installs the clean runtime component program. At a block 520, the clean runtime component performs a compliance check upon its initial execution and depending on the results from the compliance check takes either an assignment action or a self-governance action, as will be described in more detail below with reference to FIG. 6.

Figure 6:
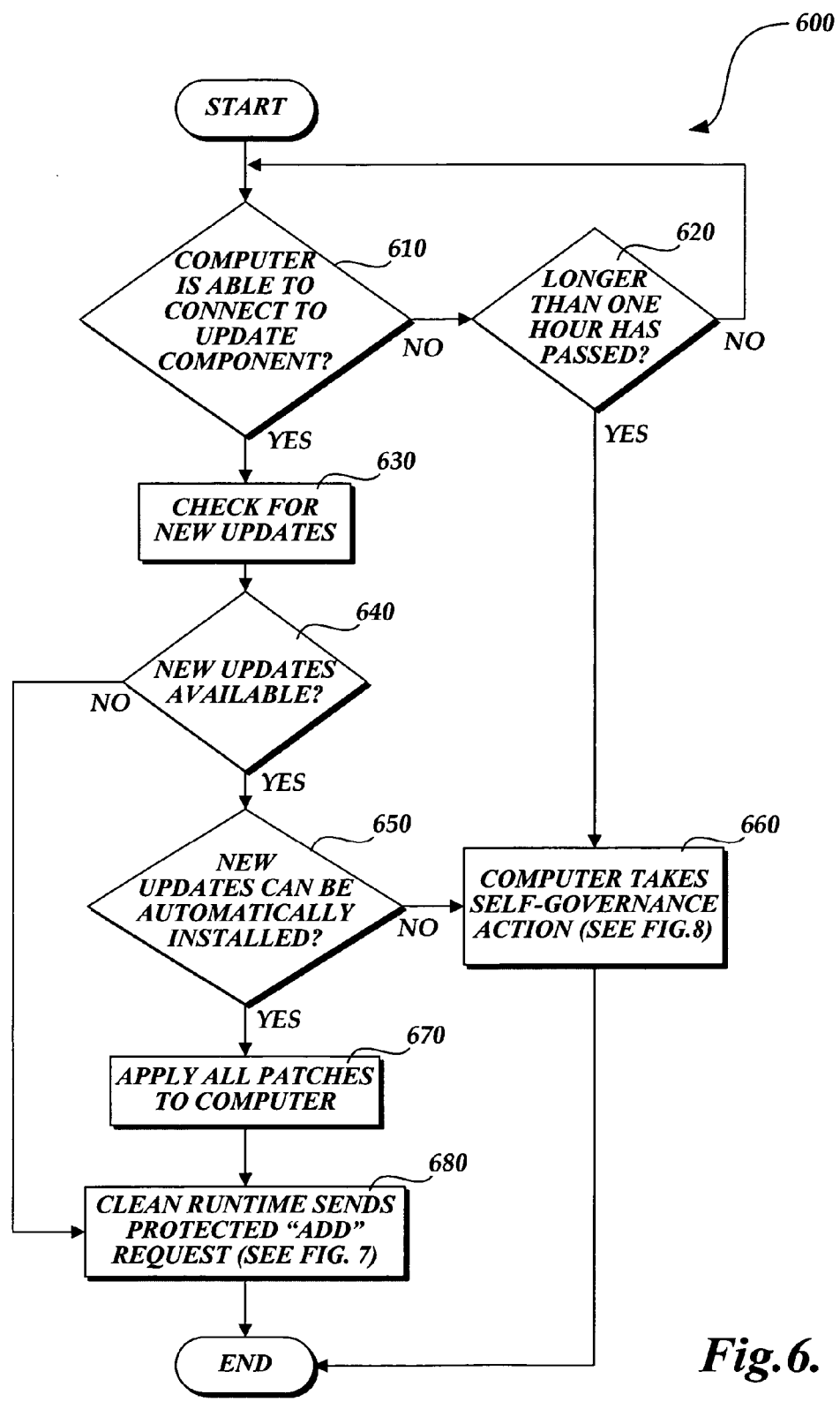
FIG. 6 is a flow diagram illustrative of a routine for performing a compliance check.

FIG. 6 is a flow diagram illustrative of a routine 600 for determining whether an assignment action or a self-governance action will be taken. At a decision block 610, a determination is made as to whether the computer is able to connect to the update component (e.g., at an update Web site). If the computer is not able to connect to the update component, the routine continues to a decision block 620, where a determination is made as to whether a specified time interval (e.g., one hour) has passed. If at decision block 620 it is determined that one hour has not passed, then the routine returns to decision block 610 to again see if the computer is able to connect to the update component. If at decision block 620 it is determined that one hour has passed, then the routine continues to a block 660, where the computer takes self-governance action, as will be described in more detail below with reference to FIG. 8.

If at decision block 610 it is determined that the computer is able to connect to the update component, the routine continues to a block 630 where the computer checks for new updates. At a decision block 640, a determination is made as to whether new updates are available. If new updates are not available, then the routine continues to a block 680 where the clean runtime component sends a protected "add" request, as will be discussed in more detail below with reference to FIG. 7. If at decision block 640 new updates are available, the routine continues to a decision block 650.

At decision block 650, a determination is made as to whether the new updates can be automatically installed. If the new updates cannot be automatically installed, the routine continues to the block 660, where the computer takes self-governance action, as will be described in more detail below with reference to FIG. 8. If at decision block 650 it is determined that the new updates can be automatically installed, the routine continues to a block 670, where all of the available and applicable patches are applied to the computer. In one embodiment, the patches may comprise security updates and/or service packs. At the block 680, the clean runtime component sends the protected "add" request, as will be described in more detail below with reference to FIG. 7.

Figure 7:
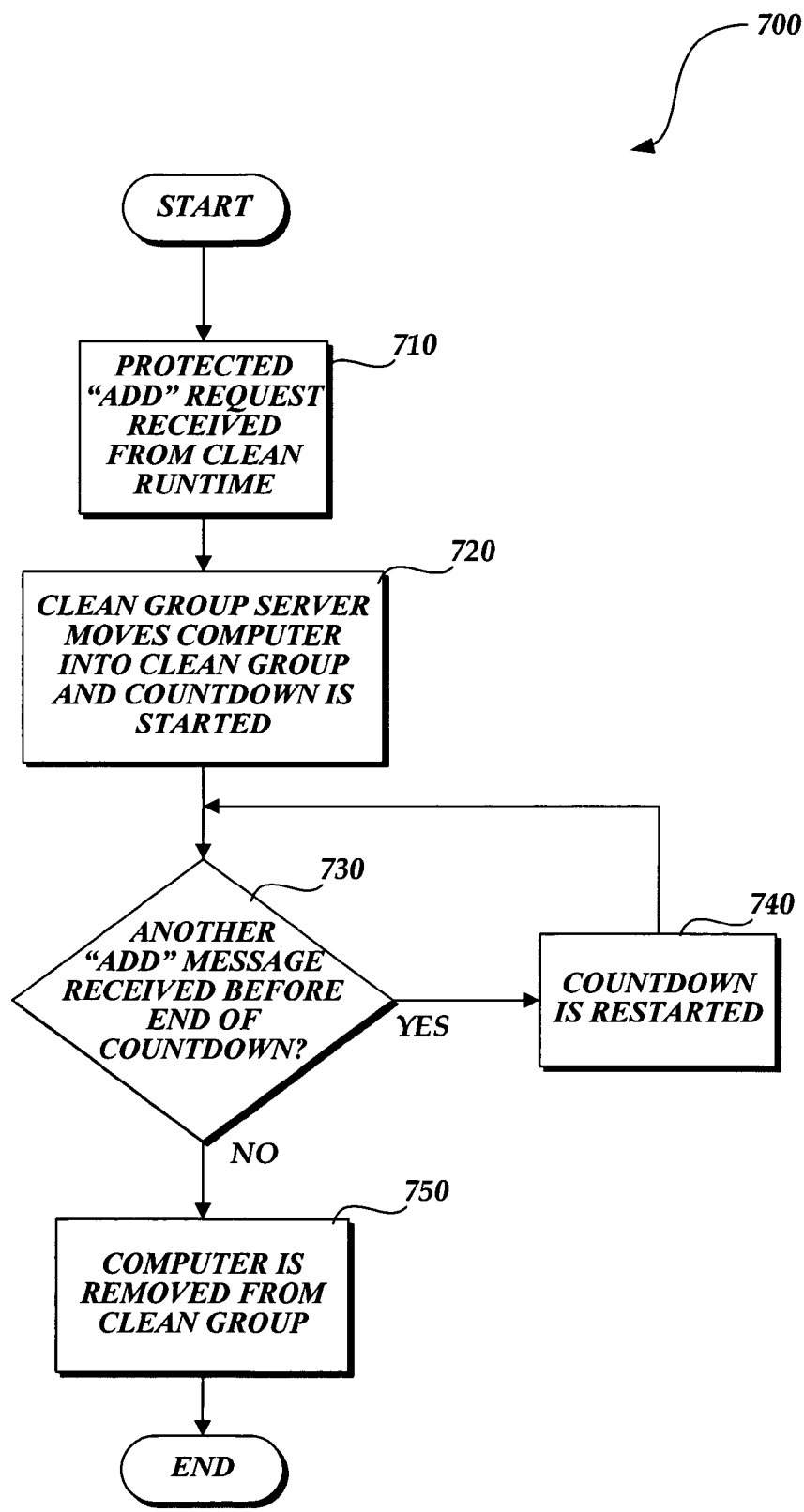
FIG. 7 is a flow diagram illustrative of a routine for performing an assignment action.

FIG. 7 is a flow diagram illustrative of a routine 700 by which an assignment action is taken. At a block 710, a protected "add" request is received from the clean runtime component. At a block 720, the clean group server moves the computer into the clean up-to-date group and a countdown is started. At a block 730, a determination is made as to whether another "add" message is received before the end of the countdown. If another "add" message is received, the routine proceeds to a block 740, where the countdown is restarted, and then returns to the decision block 730. If another "add" message is not received before the end of the countdown, the routine continues to a block 750, where the computer is removed from the clean group.

Figure 8:
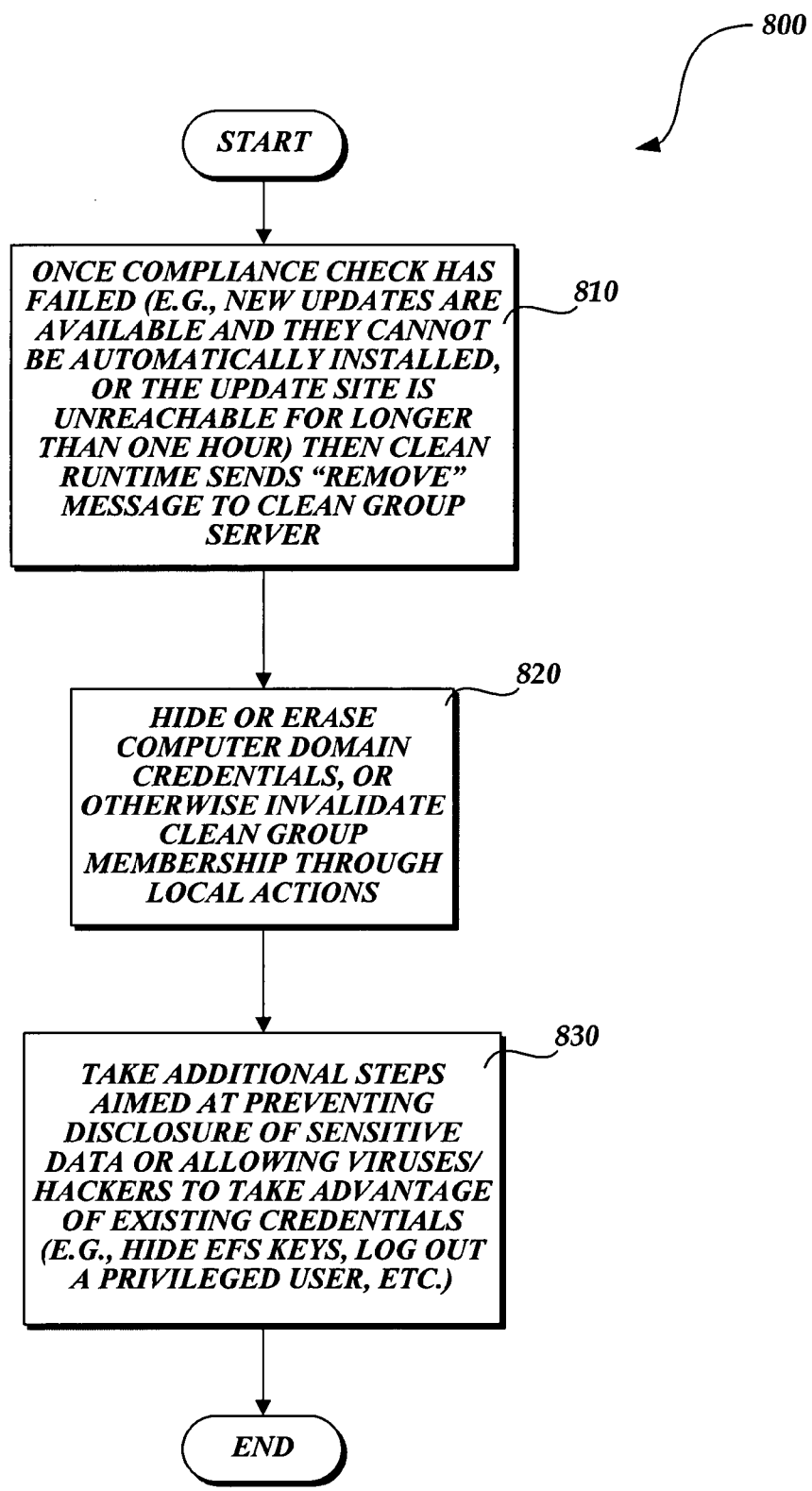
FIG. 8 is a flow diagram illustrative of a routine for performing a self-governance action.

FIG. 8 is a flow diagram illustrative of a routine 800 for a self-governance action. At a block 810, once the compliance check has failed (e.g., new updates are available and they cannot be automatically installed, or the update component Web site is unreachable for longer than one hour), the computer sends a protected "remove" request to the clean group server. At a block 820, the clean runtime component hides or erases the computer domain credentials, or otherwise invalidates the clean group membership through local actions. At a block 830, optional additional steps may be taken that are aimed at preventing disclosure of sensitive data or at preventing viruses/hackers from taking advantage of existing credentials (e.g., hiding cryptographic keys such as EFS, logging out a privileged user, etc.).

Figure 9:
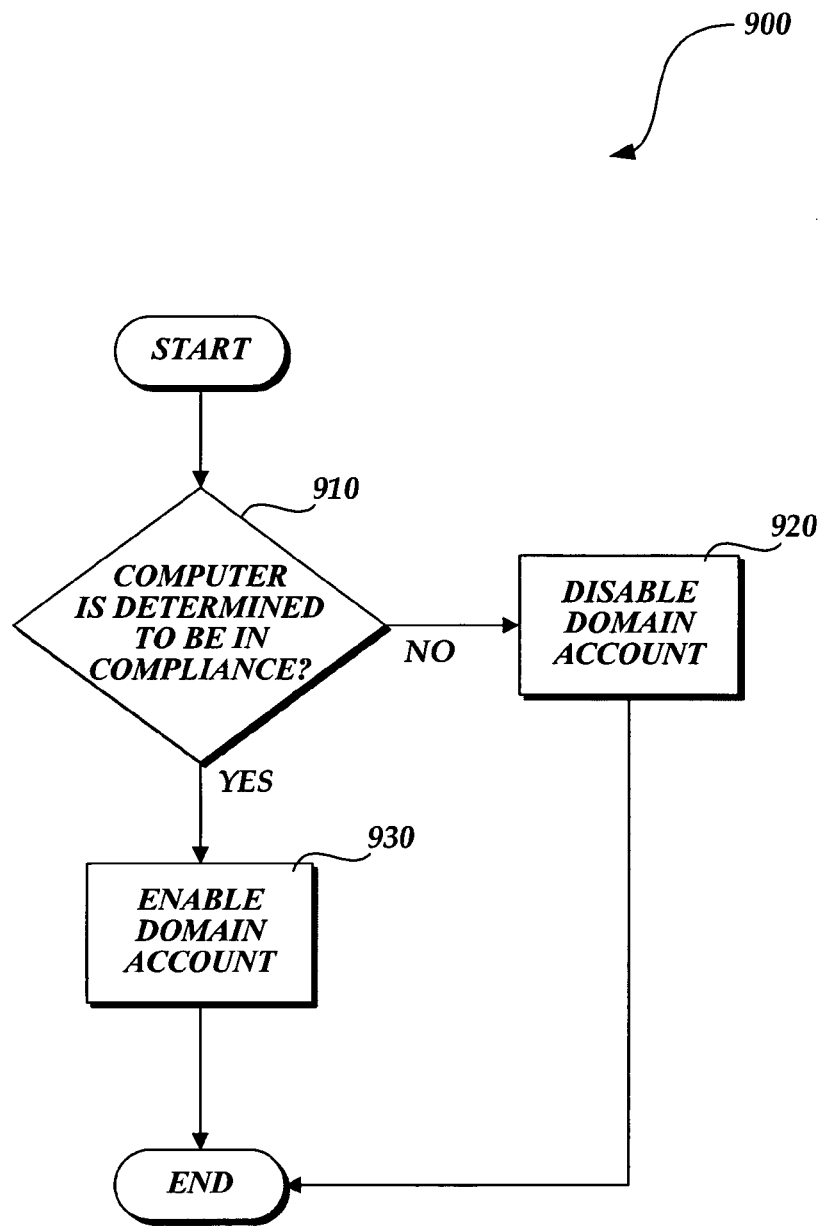
FIG. 9 is a flow diagram illustrative of a routine for an alternate embodiment of single-group membership utilizing the enabling and disabling of domain accounts.

FIG. 9 is a flow diagram illustrative of a routine 900 for an alternate implementation of single-group membership through enabling/disabling accounts. At a decision block 910, a determination is made whether the computer is in compliance. If the computer is not in compliance, the routine proceeds to a block 920 where the domain account for the computer is disabled. If the computer is in compliance, the routine proceeds to a block 930 where the domain account is enabled. The routine 900 illustrates an alternate embodiment by which computer domain accounts are enabled or disabled rather than placing computers in a clean group.

The default state of a security system, such as clean groups, is in some embodiments desired to be the secure or protected state. To that end, when clean groups are utilized, one of the objectives for placing computers that are in compliance into a clean group, rather than placing out of compliance computers into a dirty group, is that it is sometimes desirable to ensure that it takes a positive action for a computer to join a clean group rather than having a computer end up in a clean group through inaction. It is in some cases desirable to require positive action for a computer to join the clean group, because otherwise when computers first enter the system, they may by default be placed into the clean group when they are not yet in compliance. While the clean group implementation is preferred in some embodiments, in other embodiments it may be desirable to utilize a dirty group implementation. For example, in certain environments where all of the computers are accounted for, an effective approach can be to place out of compliance computers into a dirty group. Regardless of whether clean or dirty groups are utilized, in embodiments where only one type of group is desirable, an optimized approach may be available through enabling and disabling computer domain accounts, such as illustrated in the routine 900. The benefit of this method is that the enabled/disabled status may be implemented more efficiently in certain embodiments than explicit group membership. The invention covers both methods of group maintenance.

Figure 10A:
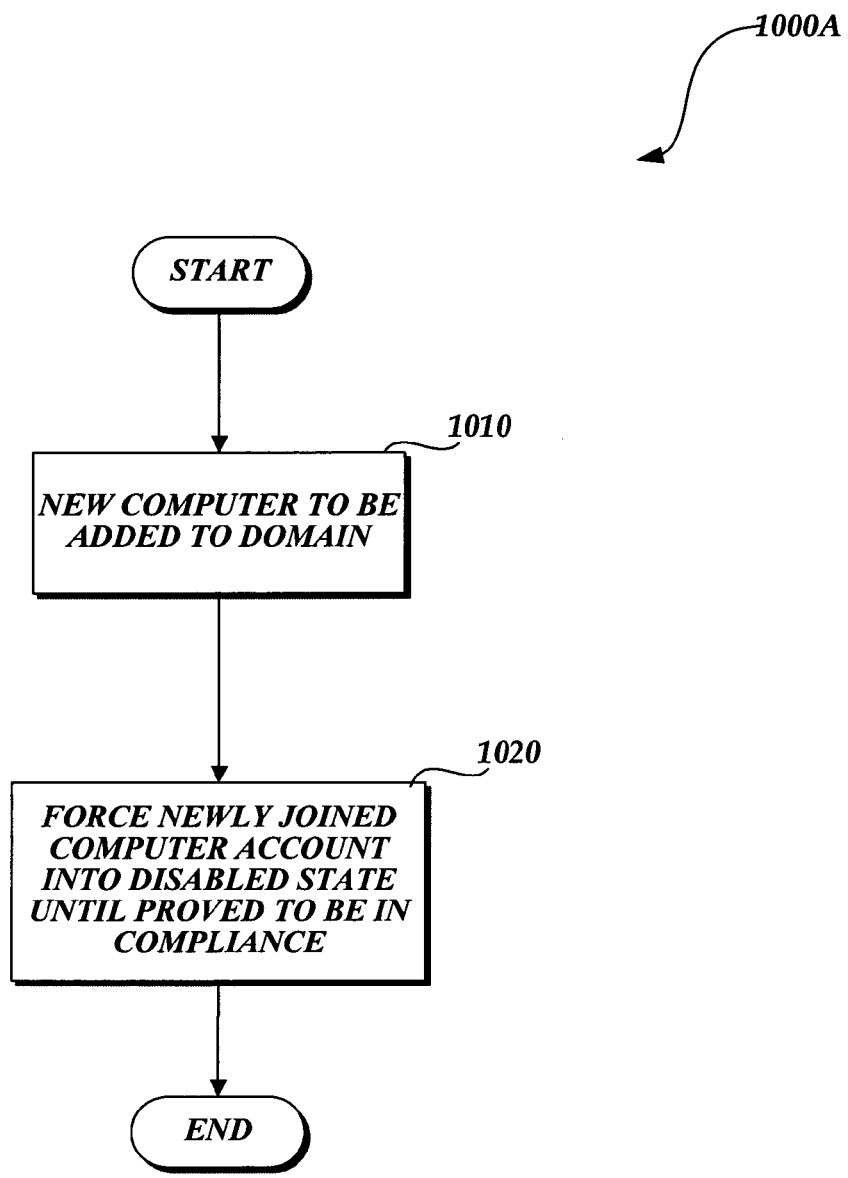
FIGS. 10A and 10B are flow diagrams illustrative of routines for preventing a new computer from joining the domain of FIG. 9 in an enabled state.
Figure 10B:
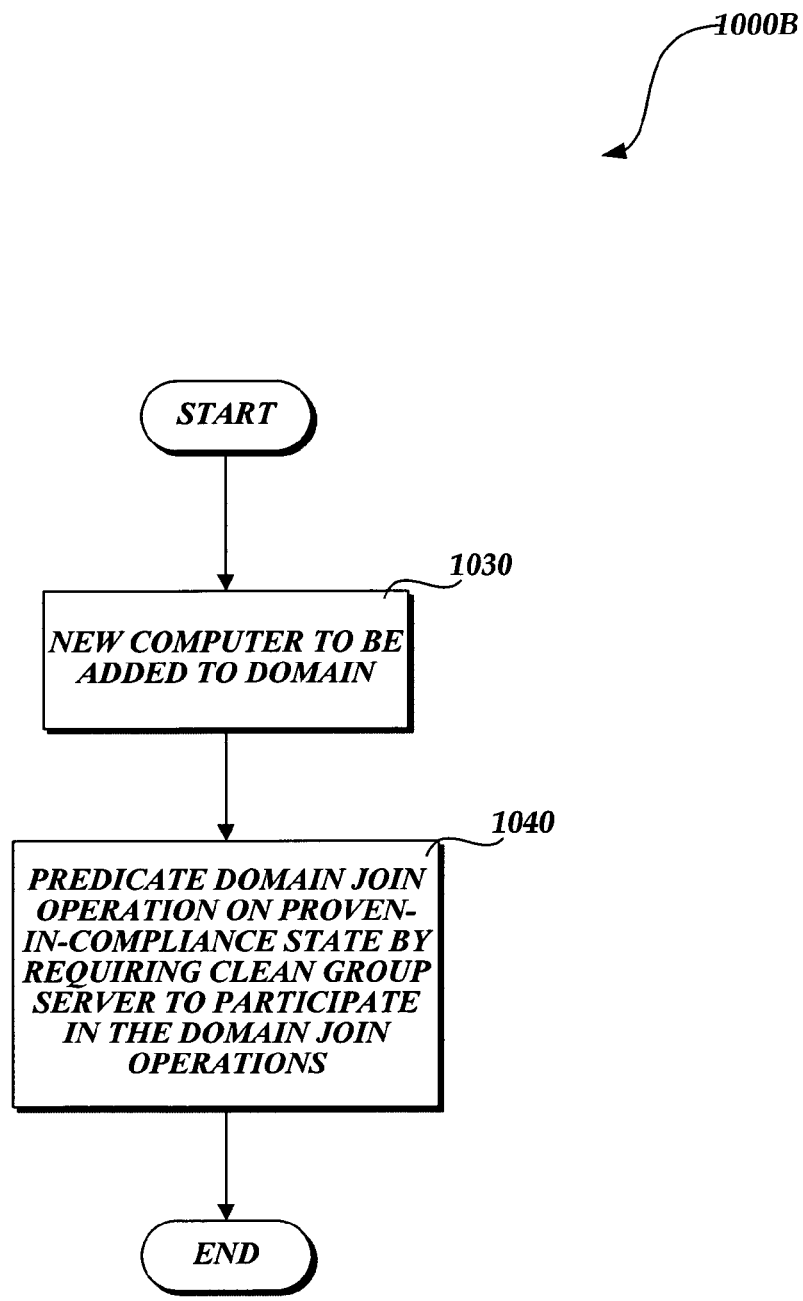

FIGS. 10A and 10B are flow diagrams that are illustrative of routines 1000A and 1000B for preventing new computers from joining the Active Directory domain ("the domain") of FIG. 9 in the enabled state. As illustrated in FIG. 10A, at a block 1010, a new computer is to be added to the domain. At a block 1020, the newly joined computer account is forced into a disabled state until it is proved to be in compliance. Forcing the account into a disabled state may be prevented in certain embodiments by allowing the computer represented by the account to prove its compliance as part of the act of joining the domain.

As illustrated in FIG. 10B, at a block 1030, a new computer is to be added to the domain. At a block 1040, the domain join operation is predicated on proving the in-compliance state by requiring the clean group server to participate in the domain join operations.

Figure 11:
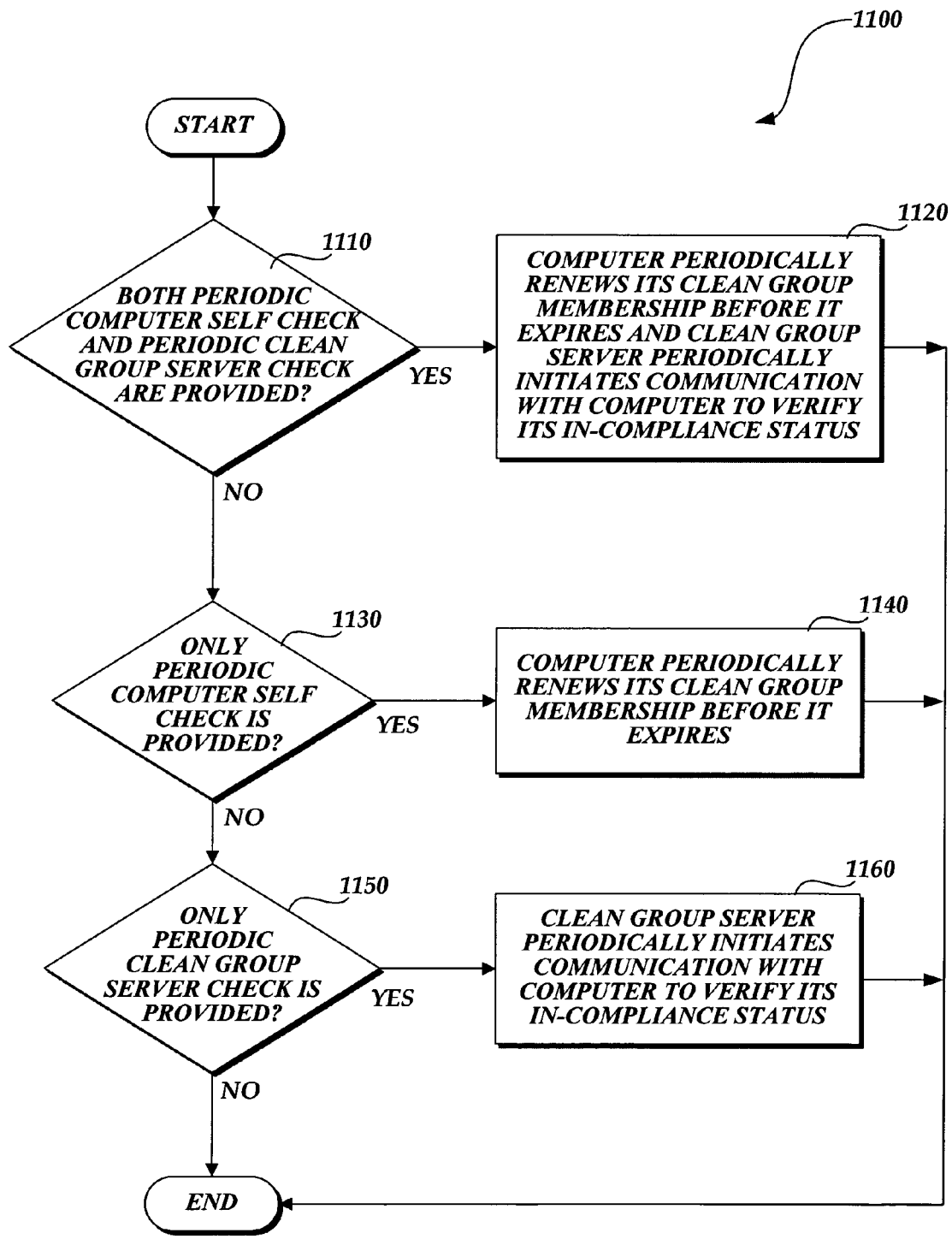
FIG. 11 is a flow diagram illustrative of a routine for providing an alternate implementation of membership renewals by which either or both the computer or the clean group server can take action to verify the computer's in-compliance status.

FIG. 11 is a flow diagram illustrative of a routine 1100 for an alternate implementation of membership renewals. FIG. 11 shows an alternate embodiment to that described above with respect to FIGS. 6-8, where individual computers periodically renew their clean group membership before it expires, and where such action is initiated by the computers through their periodic self checks. As will be described in more detail below, FIG. 11 illustrates that alternatively, the clean group server can periodically initiate communication with the individual computers to verify their in-compliance status. FIG. 11 also illustrates that an implementor may choose to provide both membership renewal options, so that customers can use either or both at the same time.

As shown in FIG. 11, at a decision block 1110, a determination is made as to whether both a periodic computer self-check and a periodic clean group server check are provided. If both are provided, then the routine continues to a block 1120, where the computer periodically renews its clean group membership before it expires, and the clean group server also periodically initiates communication with the computer to verify its in-compliance status. If at decision block 1110 both of these types of checks are not provided, then the routine continues to a decision block 1130.

At decision block 1130, a determination is made as to whether only the periodic computer self-check is provided. If only the periodic computer self-check is provided, then the routine continues to a block 1140 where the computer periodically renews its clean group membership before it expires. If the periodic computer self-check is not provided, then the routine continues to a decision block 1150, where a determination is made as to whether only the periodic clean group server check is provided. If only the periodic clean group server check is provided, then the routine continues to a block 1160 where the clean group server periodically initiates communication with the computer to verify its in-compliance status.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for providing security in a computer system, comprising:
   in a processor of a clean group server:
      specifying a set of properties for use in determining if an item is clean;
      in response to receiving an add request from an item, the add request containing evidence collected from the item relating to the presence or absence of the properties in the specified set of properties, evaluating the add request to determine if the evidence proves that the item has the specified set of properties;
      determining from the evidence in the add request whether the item has the specified set of properties, and if so, designating the item as a member of a clean group by instructing a domain controller to add the item to the clean group, the domain controller configured to store information identifying network users and resources; and
   managing access to a plurality of group policy objects through an active directory server, each of the group policy objects being associated with a group defined by the domain controller, and the active directory server providing access to each of the plurality of group policy objects to items based on membership in a group defined by the domain controller such that only members of the clean group can read the group policy object;
   wherein:
      members of the clean group communicate using security associations; and
      a group policy object of the plurality of group policy objects comprises parameters for security associations used by items of the clean group, whereby communication with items of the clean group is restricted to other items within the clean group.

2. The method of claim 1, wherein the item is a computer.

3. The method of claim 2, wherein when the computer is to be evaluated, a clean component is installed on the computer to perform compliance checks and to collect the evidence relating to the presence or absence of the properties in the specified set of properties.

4. The method of claim 1, wherein a compliance check is performed at a selected time for an item to determine if the item has the specified set of properties.

5. The method of claim 1, wherein one of the specified set of properties is whether all of the available updates have been installed.

6. The method of claim 5, wherein the updates comprise at least one of security updates or service packs.

7. The method of claim 1, further comprising receiving a message sent by the clean component after the item fails a compliance check performed by the clean component wherein the message indicates that the item should not be in the clean group.

8. The method of claim 7, further comprising invalidating the clean group membership of the item in response to receiving the message.

9. The method of claim 8, wherein the clean group membership of the item comprises local actions including at least hiding the domain credentials of the item.

10. The method of claim 7, wherein if the compliance check fails, additional steps are taken including at least hiding cryptographic keys.

11. The method of claim 1, wherein after the item is designated as a member of the clean group, a countdown is started and if another message is not received by the end of the countdown, the item is removed from the clean group.

12. The method of claim 1, further comprising initiating a status check to determine if the items in the clean group still have the specified properties.

13. A system for managing security, comprising:
a network comprising a plurality of ports, at least a first portion of the ports being wireless ports and a second portion of the ports being Ethernet ports;
a clean group server connected on the network;
a domain controller connected on the network and configured to store information identifying network users and resources including a clean group indicating a group of computers and users that are more trusted than computers and users not included in the clean group;
a plurality of items coupled to the network, with a first portion of the plurality of items being coupled through a wireless port of the plurality of ports and a second portion of the plurality of items being coupled through an Ethernet port of the plurality of ports, each item comprising a clean runtime component, the clean runtime component being installed on the item and being able to communicate with the clean group server, the clean runtime component being configured to send an add request and a remove request to the clean group server, the add request including evidence to be evaluated by the clean group server for determining whether to add the item to a clean group;
wherein:
the clean group server is configured to determine whether the evidence sent by the clean runtime component is sufficient to prove that the item is in compliance with a security policy, and if so, to designate the item as a member of the clean group by instructing the domain controller to add the item to the clean group and to remove the item from the clean group in response to the remove request;
adding an item to the clean group comprises selectively providing access to information establishing security associations; and
communication among items in the clean group is performed using the security associations, thereby quarantining items outside the clean group from receiving information from or sending information to items within the clean group.

14. The system of claim 13, wherein the plurality of items comprise computers.

15. The system of claim 13, wherein the clean runtime component is configured to perform self-governance actions in response to performing a compliance checks that indicates that the item does not meet selected criteria.

16. The system of claim 15, wherein one of the criteria is whether selected available updates have been installed.

17. The system of claim 16, wherein the updates comprise at least one of security updates or service packs.

18. The system of claim 15, wherein the clean runtime component is configured to send the add request to the clean group server only after the self-governance compliance check passes.

19. The system of claim 13, wherein the clean group server is configured to, after designating the item as a member of the clean group, start a countdown;
and if another add request is not received by the end of the countdown, the clean group server is configured to remove the item from the clean group.

20. The system of claim 13, wherein the clean group server is configured to initiate a compliance check for items to determine if they should remain in the clean group.

21. One or more computer-readable media having computer-executable components for providing security in a computer system, the computer-executable components comprising:
a clean runtime object for installation on a computer, wherein the clean runtime object, when executed, performs a compliance check to determine if the computer has a specified set of properties, and sends an add request containing evidence relating to whether the computer has the specified set of properties to a clean group server and when the clean runtime object subsequently determines that the computer does not have the specified set of properties, performs self governance actions that disable the computer from communication with the clean group; and
instructions for installation on a clean group server for processing the add request, wherein the instructions, when executed, cause the clean group server to instruct a domain controller configured to store information identifying network users and resources to add the computer as a member of a clean group upon receipt of an request, if the clean group server determines that the add request contains sufficient evidence to prove that the computer has the specified set of properties,
wherein:
adding the computer as a member of the clean group comprises selectively providing access to information establishing security associations; and
communication among items in the clean group is performed using the security associations, thereby quarantining computers outside the clean group from receiving information from or sending information to computers within the clean group.

22. The media of claim 21, wherein the compliance check is performed initially upon installation of the runtime object.

23. The media of claim 21, wherein the evidence indicates whether specified available updates have been installed on the computer.

24. The media of claim 23, wherein the specified available updates comprise at least one of security updates or service packs.

25. The media of claim 21, wherein after the add request is received by the clean group server, a countdown is started and if another message is not received by the end of the countdown, the clean group server instructs the domain controller to remove the computer from the clean group.

26. The media of claim 21, wherein the self governance action comprises at least one of erasing domain credentials, hiding domain credentials, hiding EFS keys or disabling EFS keys.

27. The media of claim 21, wherein the clean group server communicates with the runtime object to initiate a compliance check.

28. The method of claim 1, wherein:
the item is a computer; and
the method further comprises, when the computer is a member of a clean group and it is determined that the computer does not have the specified set of properties, performing self governance action, the self governance action comprising at least one of erasing domain credentials, hiding domain credentials, hiding EFS keys or disabling EFS keys.

29. The method of claim 28, wherein:
based on whether or not the clean group server determines that the computer is in compliance, the clean group server disables or enables a computer domain account on a domain controller, the domain controller configured to store information identifying network users and resources; and
when a new computer domain account is to be added to the domain, the new domain account is placed in a disabled state until the associated computer is proved to the clean group server to be in compliance.

30. The method of claim 29, wherein when a new computer domain account is to be added to the domain, the domain join operation that creates the new computer domain account is predicated on proving that the computer is in compliance by requiring the clean group server to participate in the domain join operations.

31. The method of claim 29, wherein evaluating a computer comprises determining whether available updates have been installed on the computer.

32. The method of claim 29, wherein the computer periodically performs compliance checks.

33. The method of claim 29, wherein the clean group server periodically initiates a compliance check on the computer.

34. A method for providing security in a computer system, comprising:
with a processor associated with each of a plurality of items, performing at least in part, a compliance check for the item;
communicating a result of the compliance check to a domain controller,
within the domain controller, for each of the plurality of items: altering data storage to indicate that the item is not in the clean group when the compliance check for the item fails;
storing an indication that the item is in the clean group when the compliance check for the item passes;
selectively providing access to a collection of IPSec communication requirements and parameters based on membership in the clean group maintained by the domain controller; and
blocking access to the collection of IPSec communication requirements and parameters by items not within the clean group; and
limiting communicating among items in the clean group to communication using the IPsec communication requirements, thereby quarantining items outside the clean group from receiving information from or sending information to items within the clean group.

35. The method of claim 34, wherein after an item passes a compliance check and is placed in the clean group, a countdown is started and if another compliance check is not passed by the end of the countdown, the item is removed from the clean group.

36. The method of claim 34, wherein the item is a computer.

37. The method of claim 34, wherein the item performs a compliance check.

38. The method of claim 34, wherein a clean group server initiates a compliance check on the item.

39. The method of claim 34, wherein the compliance check is performed by the item communicating with an update Web site to determine if updates are available for the item.

40. The method of claim 39, wherein the item communicates with a clean group server to establish its membership in the clean group.

41. The method of claim 34, wherein a compliance check is initiated by one or more of a client coming online, changes in client status/configuration, changes in network status/configuration, or changes to a compliance policy.

42. The method of claim 34, wherein a clean group server communicates to non-compliant items how to get back into compliance.

43. The method of claim 42, wherein the non-compliant items are directed to a Web site with online instructions to the user, and once the instructions are followed, another server-assisted compliance check is initiated.

44. The method of claim 42, wherein the non-compliant items are instructed how to get into the compliant state automatically without requiring a user's involvement.

45. The method of claim 34, wherein an item is a user, and a
user's clean group membership is evaluated on the basis of whether each of a set of computers associated with the user is in compliance.

46. The method of claim 34, wherein items within the clean group are given access to the collection of IPSec settings by binding active directory group policy to the clean group membership such that only members of the clean group can read the policy.

47. The method of claim 34, wherein a client that changes state from membership in the clean group to non-membership is required to clear all policy settings distributed via the clean group.

48. The method of claim 1, further comprising designating the item as a member of a dirty group if the clean group server determines that the item does not have the specified set of properties.

49. The system of claim 13, wherein the clean group server is further configured to designate the item as a member of a dirty group if the evidence sent by the clean runtime component is insufficient to prove that the item is in compliance with the security polio.

50. The method of claim 8, wherein the clean group membership of the item comprises local actions including at least erasing the domain credentials of the item.

51. The method of claim 7, wherein if the compliance check fails, additional steps are taken including at least logging out a privileged user.

* * * * *